UNITED STATES PATENT OFFICE.

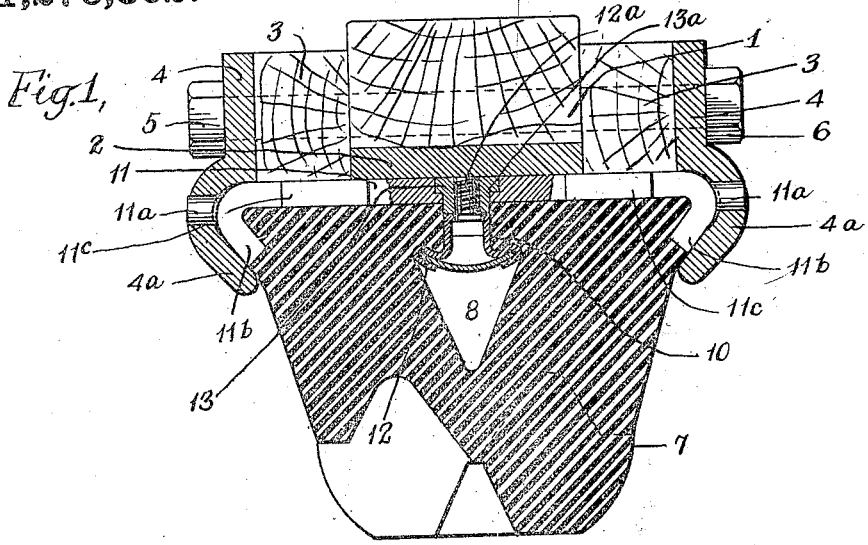

MAX CYRUS OVERMAN, OF NEW YORK, N. Y.

TIRE-SECURING MEANS.

1,276,802.

Specification of Letters Patent.  Patented Aug. 27, 1918.

Application filed October 6, 1916.  Serial No. 124,100.

*To all whom it may concern:*

Be it known that I, MAX CYRUS OVERMAN, a citizen of the United States, residing at the city, county, and State of New York, have invented certain new and useful Improvements in Tire-Securing Means, of which the following is a specification.

My present invention relates to tire-securing means, the features and advantages of which will be apparent to those skilled in the art from an understanding of the following description in connection with the drawings. In these illustrating one of the forms my invention is adapted to take, Figure 1 is a cross-sectional view of a tire, wheel-felly and flanges securing the tire to said wheel-parts; Fig. 2 is an edge view of one of the anchor plates and clamps; and Fig. 3 is a view looking at a portion of the back of the tire showing two of the anchor plates in plan located in correspondingly shaped recesses in the back of the tire.

Describing now the specific devices of the drawings:—1 is a wood felly of the wheel surrounded by a metal band 2. 3—3 are a pair of wood rings located with the parts 1 and 2 between them and having the same diameter at the part 2 so as to be flush therewith. The rings 3—3 increase the width of the felly so as to adapt it to receive my tire. 4—4 are a pair of flanges comprising a flat ring portion at the side of the wood rings 3 and bolted in that position by a plurality of bolts like bolt 5 in Fig. 1 which with its nut 6 bolts and binds together the flanges 4—4, the wood rings 3—3 and the central felly parts 1 and 2. Further the flanges have the curved or dished tire-clamping portions 4ª.

The illustrated tire 7 is covered by my earlier patents and it suffices here to say that it is a cushion tire having a longitudinal opening 8 through it. 9 is a central longitudinal slot through the base of the tire leading into the opening 8 to form the portions 10—10 by which to clamp the tire to the anchor plates 11, which in turn along with the tire are clamped and secured to the wheel-felly by the flanges 4ª.

There are a plurality of these anchor plates 11 spaced several inches apart around the tire and seated in individual recesses in its base of the same shape as the anchor plates. See Figs. 1 and 3. 11ª is a projection, preferably cylindrical or tapering on each end of the anchor plates receivable into properly spaced holes in the flanges 4ª. These prevent the plates and therefore the tire both from creeping circumferentially and from pulling off the wheel.

The ends 11ᵇ of the clamping plates are bent downwardly and inwardly, preferably on a different curve from the flanges 4ª, so that said flanges contact with and grip said ends 11ᵇ primarily above and below as shown in Fig. 1 and thereby bind the tire to the wheel all the more securely, although this is not so important or essential a feature when the projections 11ª are used.

11ᶜ—11ᶜ are extensions from the anchor-plates extending longitudinally of the tire and serve to prevent the base of the tire from creeping laterally when on the felly.

12—12 are a plurality of elongated clamping plates insertible through the slot 9 into the tire-opening 8 to engage the parts 10—10 of the tire and clamp them to the anchor-plates 11. Each clamping plate 12 has a threaded stem 12ª engaged by a nut 13 located in a recess in the top of the given anchor-plate, said nut having a reduced stem 13ª projecting through a correspondingly reduced hole through the anchor-plate and between the portions 10 of the tire. The nuts have holes or slots 13ᵇ to receive a spanner wrench and when screwed up tight to clamp together the tire and anchor-plates, the clamped parts 10—10 of the tire squeeze inwardly against the reduced portion 13ª of the nuts and act as lock means for them.

Thus it will be seen that my invention is an effective way to adapt a wide-base tire to a narrow or standard felly and to attach it to said felly or to any other suitable felly in a perfectly secure manner and with entire avoidance of creeping.

What I claim is:—

1. In combination with a tire having a recessed base, plate-means secured to the tire in said recesses having their ends at the sides of the tire and having extensions directed longitudinally of the tire, the respective recesses in the tire fitting said extensions; and wheel-flanges at the sides of the tire clamping the ends of said plates.

2. In combination with a tire having a plurality of recesses in its base, plates in said recesses secured to the tire with their ends at the sides of the tire, wheel-flanges at the sides of said tire engaging the ends of said plates, and interlocking means between said flanges and the ends of said plates.

3. In combination a built-out felly comprising a pair of rings on either side of a wheel felly, flanges projecting outwardly from the sides of the built-out felly, bolt means through said flanges and built-out felly, a tire having a plurality of recesses in its base, plates in said recesses secured to the tire with their ends at the sides of the tire, the aforesaid flanges clamping the sides of the tire and the ends of said plates in the recesses.

4. In combination, a tire having its base longitudinally divided into halves to provide clamping portions at said division, the halves of the base having surface recesses therein which extend around to the sides of the tire; plate-means, located in said recesses, extending across the halves of the base and having downwardly and inwardly directed ends in the side-recesses; means for clamping the plate-means to the tire engaging the aforesaid clamping portions; and wheel-flanges engaging said plate-ends at the sides of the tire.

5. In combination, a tire having surface recesses in its base extending around to the sides of the tire; plate-means, located in said recesses, extending across the base of the tire and having downwardly and inwardly directed ends in the side-recesses; means for securing the plate-means to the base of the tire; and wheel-flanges engaging said plate-ends at the sides of the tire.

6. In combination, a tire having surface recesses in its base extending around to the sides of the tire; plate-means, located in said recesses, consisting of a body portion extending across the base of the tire with downwardly and inwardly directed ends in the side-recesses and with extensions from said body portion which are directed longitudinally of the tire and are located near said ends; means for securing the plate-means to the base of the tire; and wheel-flanges engaging said plate-ends at the sides of the tire.

7. In combination, a tire having surface recesses in its base extending around to the sides of the tire; plate-means, located in said recesses, extending across the base of the tire and having downwardly and inwardly directed ends in the side-recesses; means for securing the plate-means to the base of the tire; wheel-flanges engaging said plate-ends at the sides of the tire; and positive interlocking means between the wheel-flanges and the plate-means.

8. In combination, a tire having surface recesses in its base extending around to the sides of the tire; plate-means, located in said recesses, extending across the base of the tire and having downwardly and inwardly directed ends in the side-recesses; means for securing the plate-means to the base of the tire; and wheel-flanges shaped to engage the plate-ends at the sides of the tire primarily at the top and bottom of said ends.

In testimony whereof, I have signed my name to this specification this 4th day of October, 1916.

MAX CYRUS OVERMAN.